(12) United States Patent
Zielfleisch et al.

(10) Patent No.: US 6,318,340 B1
(45) Date of Patent: Nov. 20, 2001

(54) FASTENING ELEMENT

(75) Inventors: Hans-Jörg Zielfleisch, Stuttgart; Rainer Pflug, Heilsbronn, both of (DE)

(73) Assignee: Ina Walzlager Schaeffler oHG (DE)

( * ) Notice: Subject to any disclaimer, the term of this patent is extended or adjusted under 35 U.S.C. 154(b) by 0 days.

(21) Appl. No.: 09/503,856

(22) Filed: Feb. 14, 2000

(30) Foreign Application Priority Data

Feb. 25, 1999 (DE) .............................................. 199 08 154

(51) Int. Cl.$^7$ ................................................. F02M 37/04
(52) U.S. Cl. ............................................ 123/470; 411/221
(58) Field of Search ................................. 123/470, 469, 123/468, 446; 239/88–96, 533.1–533.12, 600; 411/221, 120, 336, 926, 927, 917

(56) References Cited

U.S. PATENT DOCUMENTS

| | | | | |
|---|---|---|---|---|
| 1,431,459 | * | 10/1922 | Hardie | 411/221 |
| 1,440,938 | * | 1/1923 | Sieroslawski | 411/221 |
| 3,750,732 | * | 8/1973 | Moebius | 411/336 |
| 4,272,058 | * | 6/1981 | Santen | 254/98 |
| 4,620,516 | * | 11/1986 | Reum et al. | 123/275 |
| 4,829,965 | * | 5/1989 | Gartner et al. | 123/470 |
| 5,683,216 | * | 11/1997 | Erbes | 411/120 |
| 5,687,996 | * | 11/1997 | Steinmetz et al. | 285/21.1 |
| 5,904,451 | * | 5/1999 | Gerber | 408/56 |
| 5,931,388 | * | 8/1999 | Loebenfelder et al. | 239/533.2 |
| 6,142,122 | * | 12/2000 | Hoppenstedt | 123/469 |
| 6,145,536 | * | 11/2000 | Gerhard et al. | 137/510 |
| 6,176,221 | * | 1/2001 | Hofmann | 123/470 |

* cited by examiner

*Primary Examiner*—Carl S. Miller
(74) *Attorney, Agent, or Firm*—Bierman, Muserlian and Lucas

(57) ABSTRACT

A fastening element (1) such as a tensioning nut made of deep drawn steel sheet and having a threaded section (5) formed therein by rolling and on its outer peripheral surface (6), the fastening element comprises an integrally formed dog device (9) which starts from the end of the fastening element on which the threaded section (5) is arranged and comprises at least one tab-like section (7) which is bent over onto the outer peripheral surface (6) of the fastening element (1) which when viewed in axial direction, the tab-like section (7) may overlap the threaded section (5) at least partly, economic to manufacture and fulfills the requirements of light-weight construction and a particular advantage of the invention is that the dog device (9) has no influence on the threaded section (1).

6 Claims, 1 Drawing Sheet

FASTENING ELEMENT

FIELD OF THE INVENTION

The invention concerns a fastening element made as a tension nut or as a tension screw having a bush-like stepped geometry and comprising on an inner or an outer peripheral surface, at least one threaded section ending in the region of an end of the fastening element.

BACKGROUND OF THE INVENTION

A fastening element of the pre-cited type is known from GB 2 133 479 A. This fastening element is installed in a cylinder head of an auto-ignition engine and serves to receive a pump/nozzle unit for the injection of diesel oil.

A drawback of this prior art element is that it has a relatively solid structure and is made by a chipping method. For large series production, this means a considerable consumption of material and relatively high manufacturing costs. Moreover, a person skilled in the art will see from this prior art document, that this fastening element has a relatively large overall height.

OBJECTS OF THE INVENTION

It is an object of the invention to provide a fastening element of the pre-cited type which eliminates the aforesaid drawbacks.

This and other objects and advantages of the invention will become obvious from the following detailed description.

SUMMARY OF THE INVENTION

In a first embodiment of the invention, the fastening element is a tension nut which is made of deep-drawn steel sheet on whose inner peripheral surface the threaded section is made by rolling, said tension nut further comprises on an outer peripheral surface, an integrally formed dog or catch device which starts from or near the end of the fastening element in whose region the threaded section ends, said dog or catch device comprises at least one tab-like section which is bent over onto the outer peripheral surface of the tension nut.

In a second embodiment of the invention, the fastening element is a tension screw which is made of deep-drawn steel sheet on whose outer peripheral surface the threaded section is made by rolling, said tension screw further comprises on an inner peripheral surface, an integrally formed dog or catch device which starts from or near the end of the fastening element in whose region the threaded section ends, said dog or catch device comprises at least one tab-like section which is bent over onto the inner peripheral surface of the tension screw.

These measures of the invention create a fastening element which is economic to manufacture and has a relatively small overall height. A special feature of the invention is that the dog or catch device for fixing the fastening element relative to the cylinder head or for screwing onto the pump/nozzle unit (inner thread) is arranged in the region of the threaded section and starts from the end of the fastening element situated in this region. In the case of fastening elements made as solid machined parts, it is no problem, as such, to arrange a dog device, for example in the form of a polygon, in the region of the peripheral surface of the fastening element opposed to the region of the threaded section. But such measures cannot be implemented on the deep-drawn, thin-walled sheet steel element proposed by the invention.

According to a further feature of the invention, the tab-like sections can be made so that, as viewed in axial direction, they overlap the threaded section on the peripheral surface of the fastening element opposed to the surface on which the threaded section is situated. In this way, the fastening element is not influenced or deformed in the region of the threaded section and, additionally, the overall height of the fastening element is reduced compared to the prior art.

According to another feature of the invention, the tab-like section can have a rectangular or tooth-like geometry. It is, however, also possible to implement other shapes as long as a positive engagement with a connecting component is guaranteed. The tab-like section may equally well be positioned orthogonally relative to the outer peripheral surface of the fastening element and thus serve, for instance, to prevent rotation of the fastening element.

A preferred use of the fastening element of the invention is its installation in a cylinder head of an auto-ignition engine. In this case, the fastening element is configured so that a pump/nozzle unit for the injection of gaseous fuel can be inserted within its inner peripheral surface.

It goes without saying that the invention also relates to a fastening element made of thin-walled materials other than the steel sheet proposed herein. Thus, it is conceivable to use a thin-walled extrusion molded part or a part made of a light-weight material such as a polymer. Further, the tab-like section may be made in the form of a tongue punched out of the wall of the fastening element and may not be arranged directly in the region of the end of the threaded section.

The invention will now be described more closely with reference to the appended drawings.

DETAILED DESCRIPTION OF THE DRAWINGS

Figure 1:
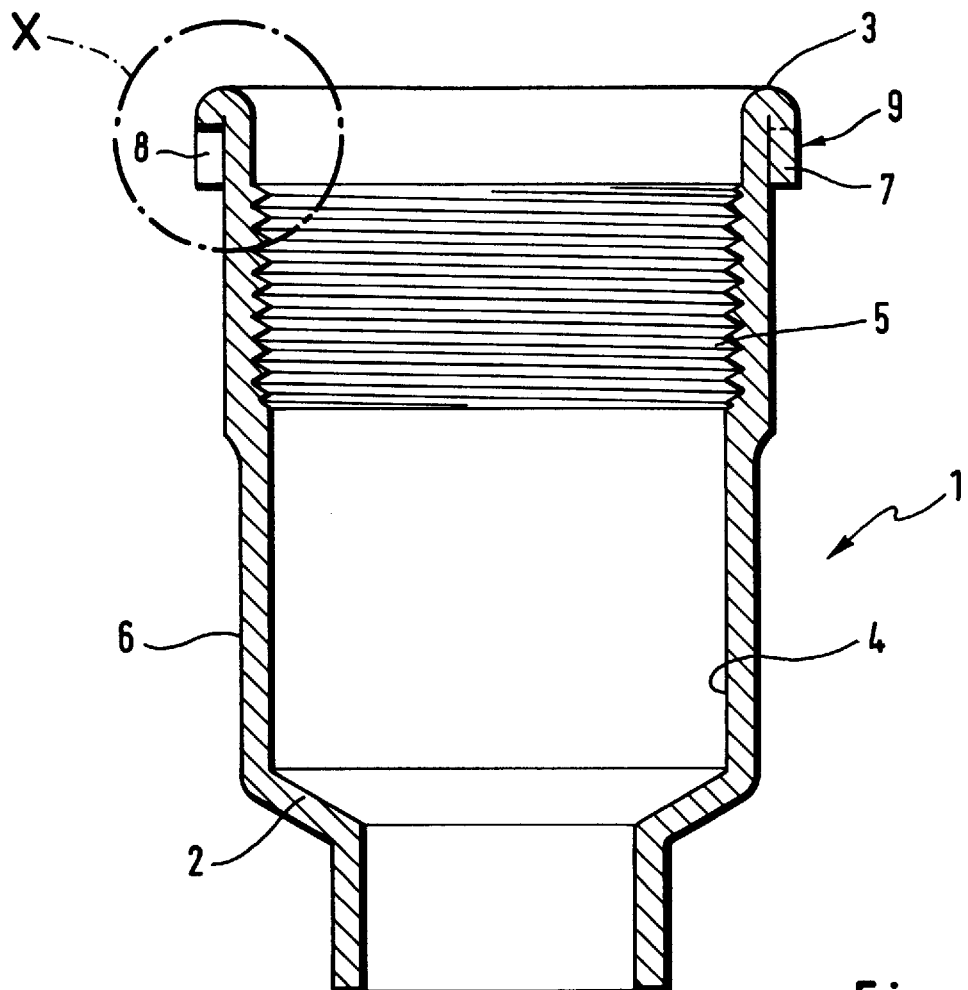
FIG. 1 shows a longitudinal cross-section through a fastening element of the invention.
Figure 2:
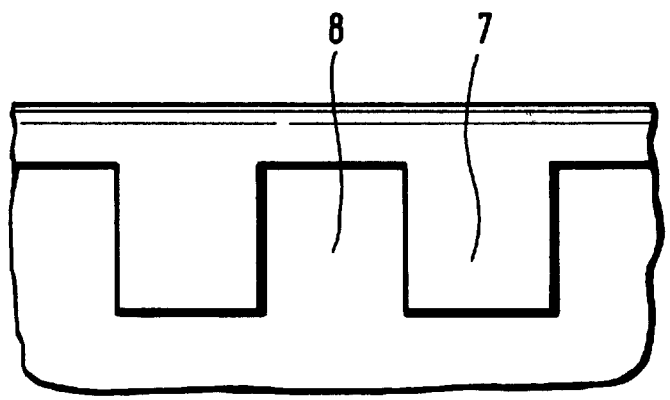
FIG. 2 shows the detail X of FIG. 1.

FIG. 1 discloses a fastening element 1 made in the form of a tensioning nut. The tensioning nut has a bush-like stepped geometry having a step section 2 intended for engagement with a complementary surface, for example, of a pump/nozzle unit for fuel injection in an auto-ignition engine.

The fastening element 1 is made of a thin-walled material, preferably, for example, a deep drawn steel sheet. In the region of one of its ends 3, the fastening element 1 comprises a threaded section 5 arranged on its inner peripheral surface 4. The fastening element 1, even when it is a tensioning nut, may comprise a further thread or similar structure on its outer peripheral surface 6 with which it extends in a reception of a cylinder head of an internal combustion engine.

Bent-over tab-like sections 7 starting from the end 3 of the fastening element 1 extend on the outer peripheral surface 6 thereof. In the present embodiment, the tab-like sections have a rectangular geometry. Although it is possible to have only one tab-like section 7, it is preferred to have a plurality of tab-like sections arranged around the entire outer peripheral surface 6. The tab-like sections 7 and the intermediate spaces 8 situated therebetween together form a dog device 9 for a positive engagement of a tool. In case of the fastening element 1 being a tensioning nut, the fastening element 1 can be easily screwed onto the aforesaid pump/nozzle unit or another similar element by the engagement of a tool into the intermediate spaces 8 between the sections 7. The dog device 9 can also serve for engagement of another tool, not specified here, for positionally fixing the fastening element relative to another component.

The invention also proposes, although this is not specifically shown in the drawings, that the tab-like sections 7 of the dog device 9, as viewed in axial direction, extend on the outer peripheral surface 6 so as to at least partly overlap the threaded section 5. This results in the creation of a simple dog device for the fastening element 1, which dog device, in spite of the very thin-walled general configuration of the fastening element, does not influence the threaded section.

In case of the fastening element being a tensioning screw, the tab-like sections are bent over onto the inner peripheral surface 4 of the fastening element 1.

What is claimed is:

1. A fastening element made as a tensioning nut with a bush-like stepped geometry wherein at least one threaded section is arranged on an inner peripheral surface of the fastening element to end in a region of an end of the fastening element, the fastening element being made of deep drawn steel sheet in which the threaded section is formed by rolling, on an outer peripheral surface, the fastening element comprises an integrally formed dog or catch device which starts from or near the end of the fastening element in whose region the threaded section ends, and the dog or catch device comprises at least one tab-like section which is bent over onto the outer peripheral surface of the fastening element.

2. A fastening element of claim 1 wherein, as viewed in an axial direction, the tab-like section overlaps the threaded section at least partly.

3. A fastening element of claim 1 wherein the fastening element is installed in a cylinder head of an auto-ignition engine, and a pump/nozzle unit for fuel injection is arranged within the inner peripheral surface of the fastening element.

4. A fastening element made as a tensioning screw with a bush-like stepped geometry wherein at least one threaded section is arranged on an outer peripheral surface of the fastening element to end in a region of an end of the fastening element, the fastening element being made of deep drawn steel sheet in which the threaded section is formed by rolling, on an inner peripheral surface, the fastening element comprises an integrally formed dog or catch device which starts from or near the end of the fastening element in whose region the threaded section ends, and the dog or catch device comprises at least one tab-like section which is bent over onto the inner peripheral surface of the fastening element.

5. A fastening element of claim 4 wherein, as viewed in an axial direction, the tab-like section overlaps the threaded section at least partly.

6. A fastening element of claim 4 wherein the fastening element is installed in a cylinder head of an auto-ignition engine, and a pump/nozzle unit for fuel injection is arranged within the inner peripheral surface of the fastening element.

* * * * *